United States Patent [19]

Kaylor

[11] Patent Number: 5,062,996

[45] Date of Patent: Nov. 5, 1991

[54] METHODS AND COMPOSITIONS FOR SORBING FLAMMABLE LIQUIDS

[75] Inventor: Joseph B. Kaylor, Jonesboro, Ga.

[73] Assignee: Jannette G. Kaylor, Manassas, Va.

[21] Appl. No.: 533,786

[22] Filed: Jun. 6, 1990

Related U.S. Application Data

[63] Continuation-in-part of Ser. No. 511,729, Apr. 20, 1990.

[51] Int. Cl.$^5$ .............................................. C09K 21/00
[52] U.S. Cl. ........................................ 252/610; 252/7; 252/601; 134/42; 106/18; 169/44; 169/46
[58] Field of Search ...................... 106/18; 252/7, 601, 252/610; 169/44, 46; 134/42

[56] References Cited

U.S. PATENT DOCUMENTS

| | | | |
|---|---|---|---|
| 3,762,865 | 10/1973 | Weil | 8/115.5 |
| 3,839,207 | 10/1974 | Weil | 252/8.1 |
| 4,073,754 | 2/1978 | Cabass et al. | 260/17 R |
| 4,384,988 | 5/1983 | Schoenholz et al. | 252/610 |
| 4,737,406 | 4/1988 | Bumpus | 428/288 |
| 4,770,715 | 9/1988 | Mandel et al. | 134/40 |
| 4,795,590 | 11/1989 | Kent et al. | 252/307 |
| 4,865,761 | 9/1989 | Mandel et al. | 252/190 |
| 4,871,477 | 10/1989 | Dimanshteyn | 252/609 |
| 4,913,835 | 4/1990 | Mandel et al. | 252/190 |

*Primary Examiner*—Robert L. Stoll
*Assistant Examiner*—Nina Bhat
*Attorney, Agent, or Firm*—Roland H. Shubert

[57] ABSTRACT

Flammable liquids are soaked up and rendered safe from ignition by mixing with the liquid a particulate composition containing an absorbent solid, a first high molecular weight polymer soluble in the flammable liquid, a dry chemical fire extinguishing agent and, optionally, a second polymer which is not soluble in the flammable liquid but is soluble in water. The first polymer gels the flammable liquid and the solution of polymer and liquid serves to adhesively bind particles of absorbent solid together while the second polymer when wet with water forms a non-combustible film over all exposed surfaces.

18 Claims, No Drawings

METHODS AND COMPOSITIONS FOR SORBING FLAMMABLE LIQUIDS

CROSS-REFERENCE TO RELATED APPLICATIONS

This application is a continuation-in-part of U.S. patent application Ser. No. 07/511,729 which was filed on Apr. 20, 1990. Now allowed Apr. 3, 1991 U.S. Pat. No. Pending.

BACKGROUND OF THE INVENTION

1. Field of the Invention

This invention relates to methods and compositions for sorbing flammable liquids and rendering them non-hazardous.

Specific embodiments of this invention include sorbent compositions which readily soak up hydrocarbons and other flammable liquids and both immobilize the liquid and render it fire safe.

2. Description of the Related Art

Spills of fuels, oils, hydraulic fluids, solvents and other flammable liquids are common in the course of equipment maintenance procedures, refueling operations and accidents involving vehicle collisions or roll overs. A great variety of absorbent materials have been used to soak up such flammable liquids from the ground, from garage floors, roadways and the like. Commonly used absorbents for this purpose include both organic and inorganic materials. Useful organic absorbents include activated carbon, sawdust, wood pulp, paper, peanut hulls, shredded peat moss and similar cellulosic materials. Commonly used inorganic absorbents include clays, pumice, expanded micas, diatomaceous earth, fullers earth and many more. A patent to Ericsson, U.S. Pat. No. 4,537,877 effectively summarizes the state of the art and presents a comprehensive description of solid absorbents, both organic and inorganic, which are used to soak up organic liquids and sets out advantages and disadvantages of the various materials.

Small spills of flammable liquids, those from a few gallons to a few tens of gallons, have ordinarily been treated quite casually in the past. It has been common practice to simply wash down small spills with water in order to reduce the hazard of fire at an accident scene or at a refueling site. Spills on shop floors and maintenance facilities were often washed down drains and into the sewer system or were soaked up with an absorbent which was then discarded with solid waste to a land fill.

Environmental concerns and regulations have rendered many of those past practices unacceptable. In most instances the practice of washing hydrocarbon spills into sewers or surface waters has been severely restricted or totally prohibited. Land fill regulations now ordinarily prohibit placement of wastes which contain leachable hydrocarbon or solvent liquids. Consequently, there has developed an increasing reliance on solid absorbents to clean up those liquid spills.

Solid absorbent compositions available today have a lot of short comings when used to clean up spills of flammable liquids. Many organic absorbents have a relatively high absorption capacity for flammable liquids but such materials are ordinarily quite flammable themselves and, if finely powdered, can even present an explosion hazard during use. Such absorbents are, of course, highly flammable after soaking up a flammable liquid and consequently tend not to reduce the fire hazard during the cleanup procedure. Inorganic absorbents, although not being combustible, offer little if any improvement in fire safety over organic absorbents as the absorbed liquid is readily ignited. Typical inorganic absorbents do not have as large an absorption capacity as do their organic counterparts and tend not to strongly retain liquid but instead tend to allow the liquid to bleed from the absorbent. Both organic and inorganic absorbents, especially if in powder form, are messy and difficult to clean up after being applied to a spilled liquid.

The safety aspects of spilled flammable liquids are receiving increasing attention and concern. Such safety concerns have at least two dimensions. In one aspect, there is concern over the exposure to fumes and vapors received by workers or others in the proximity of the spill. In another aspect, there is increasing concern and increasing regulation directed to the hazards of explosion or fire presented by the spilled liquid. The regulatory climate is tending toward requiring that spills of flammable liquids be immediately treated so as to make remote the chance of explosion or fire. Such regulations generally require that the spill be treated in a manner that effectively increases the flash point to a level, typically 140° F. (60° C.), which is relatively safe from ignition. In the case of a spill of jet fuel on tarmac during the refueling of an airplane, for example, attainment of the required safe flash point level is ordinarily accomplished by spreading an absorbent clay or similar material on the liquid and then capping the spill area with foam. The absorbent containing the spilled fuel and the foam are then gathered up, usually by hand, and placed in containers for transport to a disposal facility. Because of the highly caustic nature and fluorocarbon polymer base of the foams typically used for this purpose, the entire collected mass, absorbent, fuel and foam, usually must be treated as hazardous waste thus greatly increasing the disposal cost.

With this background, it can readily be appreciated that an absorbent composition which has a high absorption capacity for flammable liquids, which is easy to clean up and remove after soaking up a spilled liquid, which can raise the flash point of the composition containing the spilled liquid to a safe level, and which is neither caustic nor toxic provides important advances in the art of art of spilled liquid control.

SUMMARY OF THE INVENTION

Spilled flammable liquids are rendered easily handleable and fire safe by spreading on the liquid an absorbent composition comprising a particulate high molecular weight polymer, a solid, absorbent material and a fire extinguishing agent. The polymer must be soluble in the flammable liquid and the ratio of the components must be such that when the absorbent composition is loaded to capacity with a flammable liquid, sufficient polymer is dissolved in the liquid to render it highly viscoelastic and adhesive and sufficient fire extinguishing agent is present to effectively raise the flash point to a safe level.

Hence, it is an object of this invention to provide novel absorbent compositions for flammable liquids which contain as necessary components an absorbent solid, a high molecular weight polymer which is soluble in the flammable liquid and one or more solid fire extinguishing agents.

Another object of this invention is to provide methods for soaking up and removing spilled flammable liquids and to render the liquids safe from ignition, fire and explosion.

A specific object of this invention is to pick up spilled fuels and similar hydrocarbon liquids and to prevent their ignition or combustion during cleanup and transport for disposal.

Other objects will be apparent from the following description of exemplary embodiments and uses.

DESCRIPTION AND DISCUSSION OF THE INVENTION

This invention includes methods and compositions for soaking up and removing spilled flammable liquids while rendering the compositions containing the soaked up liquid cohesive and safe from ignition.

The inventor herein has previously developed fire extinguishing compositions containing particles of a thermoplastic polymer which may suitably be a high molecular weight rubber such as polyisobutylene. The polymer particles are arranged in association with a sufficient quantity of a chemical extinguishing agent to protect the polymer particles during transit through flame to the burning surface. Upon striking the surface of a flammable liquid the polymer dissolves therein causing the liquid to gel and concentrating fire extinguishing agents on the liquid surface which secures the liquid against reignition. That previous invention is the subject of a U.S. patent application, Ser. No. 07/511,729, which was filed on Apr. 20, 1990. The entire disclosure of that patent application is incorporated by reference herein.

Certain of the fire extinguishing compositions disclosed in that previous patent application can appropriately be used as one of the necessary components of the sorbent compositions of this invention. In point of fact, the sorbent compositions of this invention are also fire extinguishing compositions although often not as effective for that purpose as are most of those disclosed in that previous application.

The sorbent compositions of this invention necessarily contain three different components. A first necessary component is an absorbent solid or mixture of absorbent solids. In most instances it is preferred that at least the bulk of the absorbent solids used be non-flammable but that consideration is not necessary to the functioning of the invention. A second necessary component is a polymer which is soluble in the liquid being sorbed and is of a sufficiently high molecular weight to impart a substantial degree of viscoelasticity to the liquid. The last necessary component comprises one or more dry chemical fire extinguishing agents. It is advantageous and preferred that all three components be in finely divided form and the sorbent compositions of this invention comprise an intimate physical admixture of the components. Certain preferred embodiments of this invention include a fourth component comprising a second polymer which is not soluble in the liquid being sorbed but instead is soluble in water.

The ratio of the components making up the sorbent compositions of this invention must be set within certain parameters. There must be sufficient polymer within the composition so that, when the absorbent solid is loaded to capacity with a flammable liquid, there is imparted to the liquid a sufficiently high degree of viscoelasticity to inhibit liquid bleeding from the absorbent solid and to adhesively bond particles of the absorbent solid with sufficient strength so as to allow convenient mechanical removal from a surface. Finally, the ratio of dry chemical fire extinguishing agents to the other components must be such that the desired degree of fire safety is achieved.

The specific ratios of the three components depends upon a number of variables which are introduced through choice of the particular compounds or materials selected for use. Generally speaking, the absorbent solid will make up at least one-third and ordinarily less than about three-fourths of the sorbent composition by weight. Polymer content, again by weight of the actual polymer, will in most cases make up less than 10% of the sorbent composition. In those embodiments wherein a fourth component, the second and water soluble polymer, is included within the sorbent composition that second polymer may be present in minor amount ranging from about 2 to 20% by weight of the composition. The balance of the composition comprises solid fire extinguishing agents along with minor additives such as surfactants and lubricants, calcium stearate for example, which may be used to control dusting and enhance the flow characteristics of the composition. In most cases, the solid fire extinguishing agents will make up from about one-fourth to one-half of the composition by weight.

A wide variety of absorbent solids are suitable for use in the sorbent compositions of this invention. Inorganic, non-combustible absorbents including diatomaceous earth, absorbent clays, pumice, expanded micas such as vermiculite and the like are preferred although in certain instances organic absorbents, especially activated carbons, may be used to advantage either alone or in admixture with inorganic absorbents. For best results, it is necessary that the absorbent solids be in finely divided form so as to allow for thorough mixing with the other components of the sorbent composition.

The polymer component of the sorbent composition must be compounded such that it readily dissolves when contacted with the flammable liquid which is to be soaked up. It is most convenient to introduce the polymer moiety into the sorbent composition in the form of those polymer-containing fire extinguishing compositions described in U.S. application Ser. No. 7/511,729. In any event, the polymer used must be soluble in the flammable liquid to be soaked up and must be of sufficiently high molecular weight to impart a significant degree of viscoelasticity and adhesiveness to the liquid. Viscoelasticity is a property of a solution which causes the solution to display an elastic character when subjected to flow forces. It is expected that the compositions of this invention will find substantial use in the cleanup of spilled gasoline, jet fuels, lubricants and other hydrocarbon liquids. Accordingly, for such uses, the polymer selected must be soluble in hydrocarbon liquids. Many of the common rubbers such as, for example, polyisobutylene, polyisoprene, polybutadiene, copolymers of styrene and butadiene and the like are suitable as those rubbery polymers are all soluble in hydrocarbons generally and are soluble in a number of other common flammable solvents as well.

The polymer selected for use must have a sufficiently high molecular weight to impart viscoelasticity to the sorbed liquid and to body or to gel the liquid when dissolved therein at relatively low concentration; on the order of a few tenths of one percent to a few percent by weight. Such effects are readily obtained using polymers having a molecular weight of about 2 million or more. While lower molecular weight polymers may be used, the bodying or gelling efficiency of the polymers rapidly decreases as the molecular weight decreases.

Dry chemical extinguishing agents appropriate for use in formulating the compositions of this invention include broadly all of those agents known and conventionally used in the art. Examples of appropriate dry chemical agents include the alkali metal bicarbonates, potassium chloride, ammonium phosphates, particularly monoammonium phosphate, calcium phosphates, particularly tricalcium phosphate, the so-called carbamic powders which are addition products of urea with potassium bicarbonate, and the like. Particularly preferred chemical extinguishing agents are those which are accepted to be non-toxic and of sufficient purity to be used as a component of food products or in the processing of food products. Such particularly preferred agents include sodium bicarbonate, monoammonium phosphate and tricalcium phosphate.

It is possible, by careful selection, to make up sorbent compositions of this invention using only "food grade" components. Diatomaceous earth and absorbent clays of that quality are readily available and can be used as the absorbent solid component of the composition. Polyisobutylene of chewing gum base grade works well as the polymer moiety of those compositions used for soaking up hydrocarbon liquids. Sodium bicarbonate and monoammonium phosphate are both available in food grade purity and, either singly or preferably in combination, are effective as the fire extinguishing component of the composition. Such compositions are environmentally benign and, at least in small quantity, may be ingested without harm.

As has been set out before, it is preferred that the polymer moiety of the sorbent compositions be compounded as a polymer-containing fire extinguishing composition such as those taught by the 511,729 application. In particular, a polymer such as polyisobutylene may be chilled below its glass transition temperature and comminuted in an impact mill to obtain small particles. Size of the polymer particles is not critical but should generally be small enough to pass a 40 mesh screen. Those polymer particles are mixed with a very finely powdered coating agent while raising the temperature of the mixture to and above the glass transition temperature of the polymer. As a result, there is obtained polymer particles having a tightly adhering coating or shell of coating agent thereabout. That coating can be built up in thickness or a coating of another finely divided solid can be applied on top of the first one through use of conventional coating techniques. For example, the coated polymer particles can be tumbled in a cone blender or similar device along with a quantity of finely powdered dry chemical agent which may be the same as or different from the first coating. A small amount of water or other binding liquid may be added in the form of a mist to cause the powdered agent to adhere to and build up on the surfaces of the polymer-containing particles.

The sorbent compositions of this invention can be obtained by physical mixing of the absorbent solid with the polymer-containing fire extinguishing compositions and additional dry chemical fire extinguishing agents. Best results are obtained if the absorbent solids and the dry chemical fire extinguishing agents are in powdered or very finely divided form.

Application of the powdered sorbent composition to a flammable liquid can be accomplished by hand or the powder may be applied using equipment designed for dispersing other kinds of powders. It has been found that fire extinguishers designed for application of dry powder extinguishing agents can be readily adapted for this purpose. The sorbent compositions readily soak up gasoline, jet fuel and other hydrocarbon liquids and enough of the sorbent is applied to the liquid so that it takes on a paste or crumb-like appearance. The amount of sorbent required to completely soak up and immobilize a flammable liquid depends to some extent upon the volatility of the liquid; the more volatile is the liquid the more sorbent is required. With gasoline, for example, one part by weight of the sorbent will soak up and immobilize about two parts by weight of gasoline. At that ratio of gasoline to sorbent, a modest amount of physical mixing of the applied sorbent composition causes the sorbent particles to stick together with sufficient tenacity to form unitary globs which can be picked up by use of a fork.

At a weight ratio of one part of sorbent composition to two parts of gasoline, the gasoline is not only immobilized but a substantial degree of fire safety is achieved as well. The resulting sorbed compositions ordinarily display an increased flash point, often in excess of 140° F. (60° C.), but burn readily with a slow and controlled flame. Addition of more of the sorbent composition, so that the weight ratio of gasoline to sorbent is approximately one to one, improves the handling characteristics of the sorbed mass making it much easier to pick up from roadways and other solid surfaces. The fire safety is also further improved with the sorbed mass displaying even higher flash points but it can still be ignited by playing an open flame directly on the mass surface.

As has been set out before, certain preferred embodiments of this invention include a fourth component as a part of the sorbent composition. That fourth component is a second polymer which is not soluble in the flammable liquid being soaked up but instead is soluble in water. Suitable polymers for this purpose include water-soluble resins such as the polyacrylamides and the ethylene oxide polymers. Polyacrylamide polymers are preferred for this purpose because of the storage instability and the increasing environmental concerns over possible ethylene oxide residues commonly associated with the ethylene oxide polymers. The presence of the second polymer in the sorbent compositions of this invention does not seem to interfere in any way with the functioning of the other three sorbent components. Rather, it appears to act as would an inert filler when the sorbent composition is applied to a flammable liquid. However, when a sorbent composition containing the second polymer is applied to a flammable liquid, the resulting sorbed mass can be made essentially non-ignitable by misting water over the mass surface. The water may be applied by use of a fog nozzle, for example, and only enough water to dampen the surface is necessary. Any additional water will merely run off.

The water mist applied to the mass surface dissolves available amounts of the water soluble polymer and appears to create a thick film barrier on the surface. An open flame played on the film surface will not ignite the sorbed mass; this in spite of the fact that it contains about 50% by weight of gasoline. It is postulated that the water-polymer film also severely inhibits the passage of hydrocarbon vapors from the sorbed mass to the atmosphere and that consequence may contribute to the fire-safe effect achieved.

The ability to obtain a fire-safe condition as is provided by this invention has enormous practical benefit. Take for example, the situation in which there is a spill during the refueling of an airplane. Application of the described sorbent composition immediately immobilizes the spilled fuel and substantially decreases the chances for an accidental ignition. Thereafter, misting a water spray over the sorbed mass renders it safe from ignition even in the presence of an open flame.

An additional benefit is obtained from use of the preferred sorbent compositions. The film barrier created by misting water over the surface of the sorbed mass will dry out over a period of time. After two or three days open exposure to air, the polymer film will dry out sufficiently that it will no longer prevent ignition. At that time, the sorbed mass may be disposed of by controlled burning rather than by treating it as a hazardous waste material. The fire-safe condition of the sorbed mass may, of course, be maintained as long as is necessary or desired merely by periodically misting the surface with water.

Burning of the sorbed mass progresses in a slow and controlled fashion almost like the burning of charcoal. Much of that effect is believed caused by the distribution of particles of fire extinguishing agent around and about the absorbent particles. As the flammable liquid being soaked up contacts the polymer-containing fire extinguishing compositions, the polymer dissolves in the liquid and the resulting solution migrates to the pores within the absorbent particles and forms an adhesive or glue between the particles. As the polymer core dissolves, the particles of coating agent around that core are freed up and will tend to migrate with the solution. Thus, there is obtained a concentration of fire extinguishing agents on the surfaces of and between particles of the absorbent solid. Fire extinguishing agents such as sodium bicarbonate and monoammonium phosphate decompose under heat and that decomposition results in a slow and controlled burn of the sorbed flammable liquid.

Illustrative examples of the invention are set out below. Those examples are intended to provide a more clear understanding of the invention and are not to be considered as limiting the principles and scope of the invention.

EXAMPLE 1

A quantity of the polymer-containing fire extinguishing agent described in U.S. patent application Ser. No. 511,729 was prepared by taking a quantity of polyisobutylene having a molecular weight of about 6 million and chilling it with liquid nitrogen. The cold polymer was then comminuted by passing it through an impact mill to obtain fine particles. Those polymer particles were contacted with finely powdered tricalcium phosphate (TCP) while the polymer warmed to thereby form an adherent coating around the individual polymer particles. The tricalcium phosphate used had a median particle size of less than one micrometer and the coating amounted to about 35% by weight of the resulting composition. About 20% by weight of powdered monoammonium phosphate was then applied to the TCP-coated particles by tumbling the mixture while adding a small quantity of water as a mist to bind the coating. That composition was then coated in similar fashion with about 20% by weight of sodium bicarbonate. Lastly, a small amount of calcium stearate was added to the composition with additional mixing to enhance the flow characteristics of the powder.

EXAMPLE 2

A portion of the polymer-containing fire extinguishing composition of Example 1 was used as the polymer component in a sorbent composition. Two parts by weight of the fire extinguishing composition was added to a mixture of absorbent solids consisting of one part of diatomaceous earth, two parts of finely powdered bentonitic clay and two parts of bentonitic clay in the form of small granules. That material was added to a blend of chemical fire extinguishing agents consisting of one part of sodium bicarbonate and one part of monoammonium phosphate. That combination was thoroughly mixed to obtain a homogeneous and uniform sorbent composition.

A portion of the sorbent composition was mixed with an equal weight of commercial, unleaded gasoline. The gasoline was rapidly soaked up by the sorbent resulting in a coherent, gelled, unitary mass. The flash point of the gasolinecontaining sorbed mass was determined by slowly heating a portion in an open cup and periodically passing an open flame in proximity to the material surface. The flash point was taken to be that temperature of the material at which the test flame caused an ignition flash. The flash point, by that test, was in excess of 250° F.

EXAMPLE 3

A sorbent composition was prepared which was identical to that of Example 2 except that a second, water soluble, polymer was added in an amount equal to that of the fire extinguishing composition. That second polymer was a polyacrylamide of about 5 million molecular weight.

A portion of the sorbent composition was mixed with an equal weight of commercial unleaded gasoline. The rate at which the gasoline was soaked up and the properties of the resulting sorbed mass were essentially no different than was observed with the Example 2 sorbent. The sorbed mass obtained was dampened with a water mist. Thereafter, a torch flame was played across the surface of the mass. It did not ignite. In contrast, a torch flame played across the surface of the sorbed mass of Example 2 would cause ignition.

EXAMPLE 4

Another sorbent composition was prepared again using the polymer-containing fire extinguishing composition of Example 1 as the polymer moiety. This sorbent contained, by weight, two parts of the fire extinguishing agent, two parts of diatomaceous earth, two parts of powdered bentonitic clay, two parts of bentonitic clay granules, two parts of sodium bicarbonate, two parts of monoammonium phosphate, and onehalf part of potassium carbonate. The ingredients were mixed together to form a uniform and homogeneous composition.

One part by weight of the sorbent was added to two parts by weight of unleaded gasoline. That resulted in the gasoline becoming immobilized and gelled into a paste-like mass. One additional part by weight of the sorbent was added to give equal weights of gasoline and sorbent. The resulting sorbed mass was firm and adhered tightly together. Overall, this composition displayed a higher flash point and was rated to be somewhat better in physical properties than that one of Example 2.

EXAMPLE 5

Yet another sorbent composition was prepared using the polymer-containing fire extinguishing composition of Example 1 as the polymer moiety. This sorbent composition contained, in weight percent, about 13% of the fire extinguishing composition, 49% diatomaceous earth, 12% bentonitic clay powder, 3% powdered activated carbon, 13% sodium bicarbonate, 7% monoammonium phosphate, and 3% potassium carbonate. The ingredients were blended together by tumbling until a uniform and homogeneous mixture was obtained. A small amount of a surfactant comprising sodium lauryl sulfonate was added during the mixing to lay the dust.

One part by weight of this sorbent composition was added to two parts by weight of unleaded gasoline with mild mixing to obtain a gelled, coherent mass. That sorbed mass displayed a flash point in excess of 140° F. Additional sorbent composition was added with stirring until there was present an equal weight of sorbent and gasoline. At that point the sorbed mass would ignite when a flame was played across the surface and would slowly burn.

EXAMPLE 6

Another sorbent was prepared having a composition identical to that of Example 5 except that it additionally contained a second, water soluble, polymer in an amount equal to that of the fire extinguishing composition. The second polymer was again a polyacrylamide having a molecular weight of about 5 million as was used in the composition of Example 3.

The performance of this sorbent when used to soak up gasoline was essentially the same as that of the Example 5 sorbent. However, when a sorbed mass containing equal weights of this sorbent and gasoline was dampened by a water mist, it could not be ignited by playing an open flame on the surface of the mass. Overall, this sorbent was rated to be somewhat better than that one of Example 4 and considerably better than those of Examples 2 and 3.

While the examples of sorbent compositions set out above all utilized the polymer-containing fire extinguishing compositions of parent application Ser. No. 511,729 as the polymer moiety, it is not necessary to provide the polymer in that form. Rather, the polymer can be added in any convenient fashion so long as it is in the form of small, discrete particles which are available to rapidly dissolve in a flammable liquid. For example, the polymer may be mulled with a finely divided particulate material, preferably but not necessarily a dry chemical fire extinguishing agent, and the mulled mixture may then be shredded into small particles.

As will be appreciated by those of ordinary skill in the art, there is a wide number of available choices for the specific components making up the sorbent compositions of this invention. For example, the polymer may be selected specifically for its solubility in one particular flammable liquid. The level of fire safety obtained may be varied by changing the ratio of the various components. Rather than being employed only to soak up a spill, the sorbent compositions of this invention can also be used to catch and contain leaks from operating machinery, storage tanks and the like.

I claim:

1. A composition for absorbing a flammable liquid comprising a mixture of absorbent solids, dry chemical fire extinguishing agents and a polymer; said polymer being soluble in said flammable liquid and being of sufficiently high molecular weight to gel said liquid and to impart viscoelasticity to it; the ratio of polymer to absorbent solids being set such that when said absorbent solids are loaded to capacity with said flammable liquid, particles of said absorbent solid are bonded together with sufficient strength to allow convenient mechanical removal of said composition from a surface; and the ratio of dry chemical fire extinguishing agents to said absorbent solids and polymer being set such that the flammability of said composition after absorbing said liquid is reduced to a selected level.

2. The composition of claim 1 wherein said absorbent solids make up from about one-third to about three-fourths of the composition by weight.

3. The composition of claim 2 wherein said absorbent solids comprise one or more inorganic, non-combustible absorbents selected from the group consisting of diatomaceous earth, absorbent clays, pumice and expanded micas.

4. The composition of claim 2 wherein said absorbent solids comprise a mixture of a major amount of an inorganic, non-combustible absorbent and a minor amount of activated carbon.

5. The composition of claim 1 wherein said polymer is a rubber having a molecular weight in excess of 2 million and wherein said rubber makes up less than 10% by weight of the composition.

6. The composition of claim 1 wherein said dry chemical fire extinguishing agents are selected from the group consisting of alkali metal bicarbonates, potassium chloride, ammonium phosphates, addition products of urea with potassium bicarbonate, and mixtures thereof.

7. The composition of claim 1 further including a second polymer, said second polymer being insoluble in said flammable liquid but soluble in water.

8. The composition of claim 7 wherein said second polymer is a polyacrylamide and wherein the amount of said second polymer ranges from about 2% to about 20% of the composition by weight.

9. A method for soaking up a spilled flammable liquid and decreasing its fire hazard which comprises applying to the flammable liquid a composition comprising a mixture of adsorbent solids, dry chemical fire extinguishing agents and a polymer; said polymer being soluble in said flammable liquid and being of sufficiently high molecular weight to gel said liquid and to impart viscoelasticity to it; the ratio of polymer to absorbent solids being set such that when said absorbent solids are loaded to capacity with said flammable liquid, particles of said absorbent solid are bonded together with sufficient strength to allow convenient mechanical removal of said composition from a surface; and the ratio of dry chemical fire extinguishing agents to said absorbent solids and polymer being set such that the flammability of said composition after absorbing said liquid is reduced to a selected level.

10. A composition comprising a flammable hydrocarbon liquid having dissolved therein a polymeric rubber having a molecular weight greater than 2 million, said liquid contained within a particulate absorbent solid, said solid selected from the group consisting of diatomaceous earth, absorbent clays, pumice, expanded micas, activated carbon, and mixtures thereof, said solution of liquid and polymer binding adjacent particles of absorbent solid together, and having particles of a dry chemical fire extinguishing agent dispersed in said solution around and between said particles of absorbent solid.

11. The composition of claim 10 wherein said dry chemical fire extinguishing agents are selected from the group consisting of alkali metal bicarbonates, potassium chloride, ammonium phosphates, addition products of urea with potassium bicarbonate, and mixtures thereof.

12. A composition for soaking up a flammable liquid and rendering it fire resistant which comprises:
   a particulate solid selected from the group consisting of inorganic, non-combustible absorbents, absorbent carbon, and mixtures thereof;
   a first polymer, said first polymer being soluble in said flammable liquid and having a molecular weight sufficiently high to gel said flammable liquid and to render it viscoelastic;
   a particulate, dry chemical fire extinguishing agent selected from the group consisting of alkali metal bicarbonates, potassium chloride, ammonium phosphates, addition products of urea with potassium bicarbonate, and mixtures thereof; and
   a second polymer, said second polymer being soluble in water but insoluble in said flammable liquid.

13. The composition of claim 12 wherein said first polymer is a rubber having a molecular weight in excess of 2 million and wherein said second polymer is selected from the group consisting of ethylene oxide polymers and polyacrylamides.

14. The composition of claim 13 wherein said second polymer is a polyacrylamide having a molecular weight of 5 million or greater and wherein said particulate solid includes diatomaceous earth and absorbent carbon.

15. The composition of claim 12 consisting of between 33% and 75% by weight of said particulate solid; up to 10% by weight of said first polymer; between 25% and 50% by weight of said dry chemical fire extinguishing agent; and between 2% and 20% by weight of said second polymer.

16. A method for soaking up a flammable liquid in an absorbent and rendering the resulting product nonflammable which comprises mixing with said flammable liquid a composition which comprises a particulate solid selected from the group consisting of inorganic, non-combustible absorbents, organic absorbents, absorbent carbon, and mixtures thereof; a first polymer, said first polymer being soluble in said flammable liquid and having a molecular weight sufficiently high to gel said flammable liquid and to render it viscoelastic; a particulate, dry chemical fire extinguishing agent selected from the group consisting of alkali metal bicarbonates, potassium chloride, ammonium phosphates, addition products of urea with potassium bicarbonate, and mixtures thereof; and a second polymer, said second polymer being soluble in water but insoluble in said flammable liquid; and thereafter wetting the surface of the resulting product with water.

17. The method of claim 16 wherein more than one pound of said composition is mixed with every two pounds of said flammable liquid.

18. The method of claim 16 wherein the surface of said product resulting from the mixing of said composition with said flammable liquid is wetted by contacting it with a fog-like water spray.

* * * * *